No. 875,467. PATENTED DEC. 31, 1907.
M. SLOTKIN.
MOTIVE POWER FOR VEHICLES.
APPLICATION FILED APR. 17, 1907.
2 SHEETS—SHEET 1.
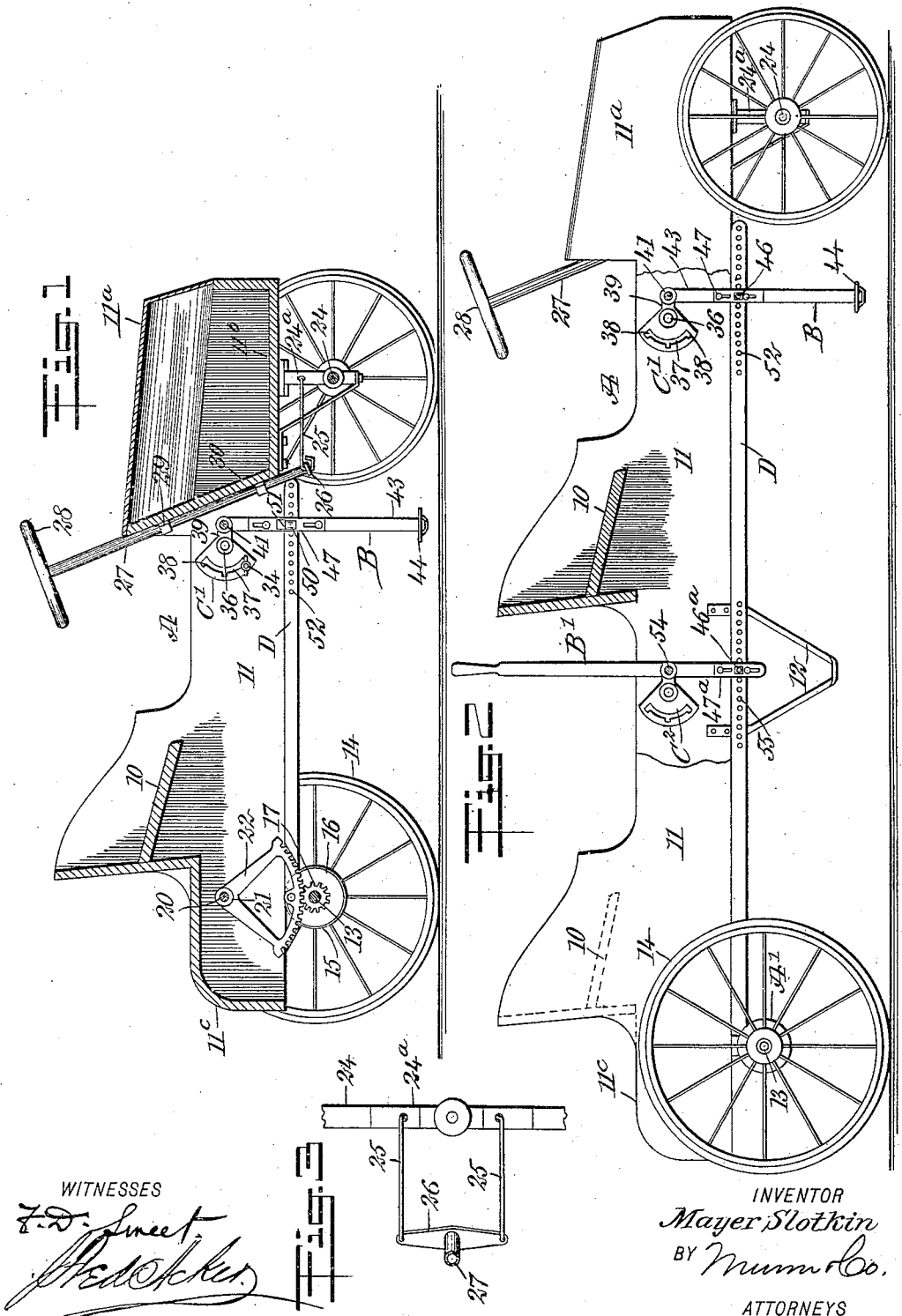
WITNESSES
INVENTOR
Mayer Slotkin
BY
ATTORNEYS No. 875,467.
PATENTED DEC. 31, 1907.
M. SLOTKIN.
MOTIVE POWER FOR VEHICLES.
APPLICATION FILED APR. 17, 1907.
2 SHEETS—SHEET 2.
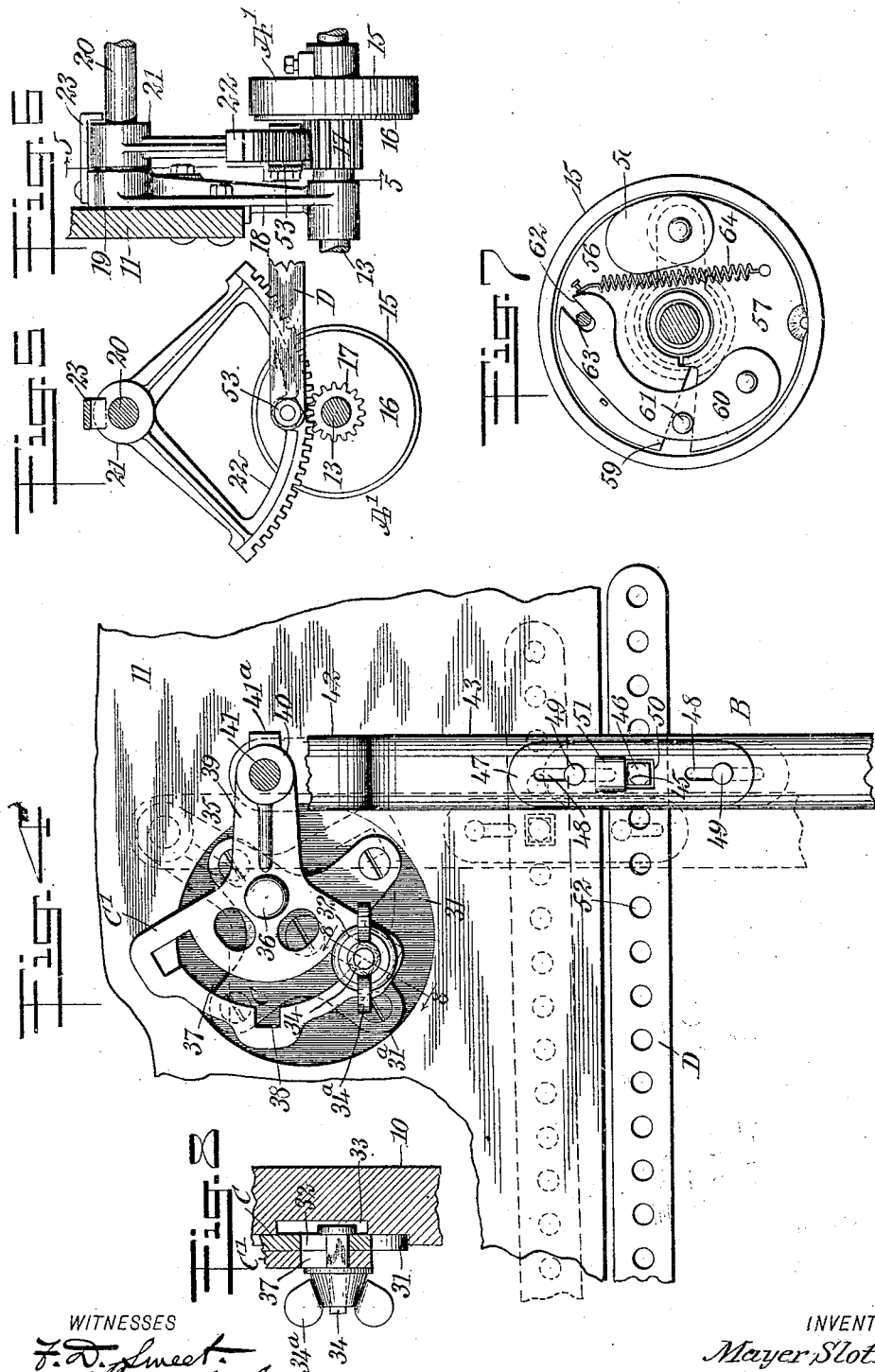
WITNESSES
INVENTOR
Mayer Slotkin
BY Munn & Co.
ATTORNEYS

UNITED STATES PATENT OFFICE.

MAYER SLOTKIN, OF NEW YORK, N. Y.

MOTIVE POWER FOR VEHICLES.

No. 875,467.  Specification of Letters Patent.  Patented Dec. 31, 1907.

Application filed April 17, 1907. Serial No. 368,760.

*To all whom it may concern:*

Be it known that I, MAYER SLOTKIN, a citizen of the United States, and a resident of the city of New York, borough of Manhattan, in the county and State of New York, have invented a new and useful Improvement in Motive Power for Vehicles, of which the following is a full, clear, and exact description.

The purpose of the invention is to provide a simple construction of motive power for vehicles, operating through the medium of pedals or hand levers or both, the construction being such that the pedals or hand levers may be adjusted vertically or laterally, accommodating the device to young or mature persons and to all conditions of length of limb.

It is also a purpose of the invention to provide a device of the character described, that is adapted to vehicles of all dimensions, and to construct the device with a minimum number of parts and so that those employed are not liable to disarrangement; and further to so simplify the means of adjustment that said means may be readily understood by any person of ordinary intelligence, and can be operated with ease even by a comparatively young person.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all the figures.

Figure 1 is a longitudinal vertical section through a vehicle having the improved motive power applied, showing the latter operated by foot treadles only; Fig. 2 is a side elevation of the vehicle and applied motive power illustrating the latter operated by both foot treadles and hand levers; Fig. 3 is a sectional plan view of the means employed for steering; Fig. 4 is an enlarged inner face view of a part of a side section of the vehicle, a face view of the means employed for vertically adjusting the pedal shaft which appears in section, a side elevation of one of the pedals and locking device carried thereby, and a side elevation of that portion of a converting bar that is adjustably connected with the pedal; Fig. 5 is a vertical section taken practically on the line 5—5 of Fig. 6; Fig. 6 is a vertical section through a part of one side portion of the vehicle body showing a portion of the axle in side elevation, a clutch device carried thereby, and a front view of the means employed for actuating the clutch; Fig. 7 is a face view of the clutch shown in Fig. 6, the pinion member having been removed; and Fig. 8 is a detailed section taken practically on the line 8—8 of Fig. 4, illustrating the manner in which the devices carrying the pedal shaft are held in adjustment.

A represents the body of a vehicle which is made to resemble the body of an automobile. In Fig. 1 the said body A is shown provided with a single seat 10 and in Fig. 2 it is shown provided with a front and the rear seat similarly designated. The bottom of the body is open except at its forward end where the representation of a hood $11^a$ is produced the bottom $11^b$ whereof is closed, and in the construction of the said body at its open bottom portion side pieces 11 are connected at the rear by a suitable combined rear and top member $11^c$. When a single seat 10 is employed the feet of the occupant are supported by pedals B, and where two seats are provided for the vehicle body, the occupant of the front seat is provided with pedals to support the feet, while foot rests 12 are provided for the occupant of the rear seat.

The rear axle 13 is provided with suitable supporting wheels 14 secured thereto and upon said axle 13 adjacent its ends clutch devices A' are located. These clutch devices will be hereinafter more fully described, but they consist essentially of a circular box-like body 15 open at one side, which body 15 is secured to the axle 13, as is shown in Fig. 6, and the disk member 16 which is loose upon the axle 13 and adapted to lie close to the open side of the box body 15 of the device, and each disk member 16 is provided with an attached pinion 17, also loosely mounted on the axle, consequently the disk member 16 of each clutch device may be termed a pinion member. The axle 13 is mounted to turn in bearings at the lower end of hangers 18 secured to the inner faces of the sides 11 of the body, as is shown in Fig. 6, and each hanger 18 is provided with a socket 19 at its upper end, and the end portions of a shaft 20 are secured in the sockets 19 of the hangers 18, as is also shown in Fig. 6, the shaft 20 being above and parallel with the axle 13.

The hubs 21 of two segmental racks 22 are mounted to turn loosely on the shaft 20 adjacent the sockets 19 of said hangers, the teeth of the segmental racks 22 meshing with the teeth of the pinions 17 of the clutch devices A'. The segmental racks 22 are held in proper position on the shaft 20 in any approved manner, as, for example, by brackets 23 that are secured to the upper ends of the hangers 18 and extend over the upper ends of the segmental racks and down at the inner faces of the same, as is shown in Fig. 6.

The forward axle 24 is provided with an attached bolster 24$^a$, and this bolster has a pivotal connection with the hood 11$^a$ of the body. Any approved form of steering device may be employed, that shown in the drawings consisting of links 25 that are attached to the end portions of the bolster 24$^a$, as is shown in Figs. 1 and 3, and are also pivotally connected with a cross head 26 at the lower end of a steering shaft 27 having a wheel 28 at its upper end. This steering shaft 27 is mounted to turn in bearings 29 that are secured to the rear face of the rear wall 30 of the hood 11$^a$.

At a point in front of the forward seat 10 of the vehicle body a circular recess or cavity 31 is made in the inner face of each side piece 11 of the body. These recesses or cavities 31 are opposite each other and in each recess or cavity 31 a wear plate C is secured of a spider-like construction, being preferably provided with four arms, as is shown best in Fig. 4. Opposing arms of the wear plates extend diagonally in opposite directions, although they may be otherwise placed, and in the lower downwardly and rearwardly extending arm 31$^a$ of the wear plate, a longitudinal slot 32 is produced, shown in dotted lines in Fig. 4, and in full lines in Fig. 8, and back of the slot 32 a recess 33 is made in the back wall of the cavities 31, as is shown in Fig. 8.

A bolt 34 extends out through the slot 32 in each wear plate C, the heads of which bolts are in the aforesaid recesses 33, and the outer end portions of the bolts are provided with wing nuts 34$^a$, and accompanying washers, as is best shown in Fig. 8. Each wear plate carries a segmental bearing plate C', the convexed edges of which plates face to the rear, and at the central portions of the forward edge of each bearing plate C', a pivot pin 36 is loosely passed into the arm 35, for example, of the wear plate C, the arms 35 of the wear plates being opposite the arms 31$^a$ having the slots 32 in which the bolts 34 have movement. Each segmental bearing plate C' is provided with a segmental slot 37 adjacent its convexed edge, as is particularly shown in Fig. 4, and in the rear wall of each of said slots 37 two or more, usually three, recesses 38 are made and the bolts 34 are slidably mounted in the wear plates C extending out through the slots 37 in the bearing plates C', and when the bolts 34 are loosened the bearing plates C' may be adjusted vertically either up or down and the bolts for adjustment be made to enter the most convenient recess 38, whereupon the wing nuts 34$^a$ of the bolts are tightened, pivotally holding the bearing plates C' in their adjusted positions.

An arm 39 extends forwardly from the pivot portion of each segmental bearing plate C', and each of the arms 39 is provided with a collar 40 at its forward end, and the ends of a pedal shaft 41 are made to enter the said collars 40, being fixed therein by means of set screws 41$^a$, or the equivalents of the same. The pedals B above referred to are supported from the shaft 41. These pedals consist each of a straight body bar 43 of greater or lesser length, and a foot member 44, and the body section 43 of each pedal is preferably provided with a bifurcated upper end portion 42, which upper section 42 is loosely mounted on the shaft 41, being free to rock on said shaft, and suitable means are provided for preventing the pedals B from moving laterally on said shaft. The outer face of each of the body bars or sections 43 of each pedal B, is preferably convexed and is provided with an opening 45 at a point preferably between its center and upper end, and the openings 45 in the body sections of the pedals are adapted to receive pins 46 the heads whereof are polygonal or rectangular, as is shown in Fig. 4.

A latch plate 47 is mounted to slide longitudinally upon the convexed face of the body section of each pedal B at the portion where a pin 46 is passed through the same, and each latch plate 47 is provided adjacent its end with a vertical or longitudinal slot 48 through which pins 49 are passed into the body bar of a pedal, as is also best shown in Fig. 4, and an opening 50 is produced at or about the central portion of each latch plate 47 of sufficient size and shape to receive the head of the pin 46, and above this opening 50 a hood 51 is formed on an outer face of each latch 47, and when the pin is to be passed through the body bar of a pedal the latch is carried up to the position shown in positive lines in Fig. 4, bringing the pin 46 in the plate opposite the pin receiving opening 45 in the body of the pedal, and after the pin 46 has been passed through the body portion of a pedal the latch-plate belonging to the pedal is permitted to drop to the position shown in dotted lines in Fig. 4, whereupon the hood 51 will cover the head of the pin 46 and prevent the pin from accidentally leaving its position.

In connection with each pedal B a transmitting bar D is provided, the forward ends of which transmitting bars pass through the body portions 43 of the pedals B at that part of the body in which the pin receiving opening 45 is made, and at the forward end of each transmitting bar D a series of longitudinally arranged apertures 52 is made, and the pins 46 of the body portions of the pedals B are passed through any one of such apertures, and the rear ends of the transmitting bars D are pivotally attached to the central portions of the tooth carrying sections of the segmental racks 22, as is shown in Figs. 1, 5 and 6. Thus it will be observed that by the adjustment of the segmental bearing plates C' the pedals may be raised and lowered to accommodate the operator, and that by the adjustment of the pedals relatively to the transmitting bar D the pedals may be adjusted further from or closer to the seat, as may be required. When the pedals B are operated, motion is transmitted through the transmitting bars D to the segmental racks 22 and from said segmental racks to the pinion members 16 of the clutch devices A' which in their turn communicate motion to the body members 15 of the clutch devices, causing the rear axle to be continuously revolved during the operation of the pedals in the same direction.

In addition to the pedals B, hand levers B' may be employed, and when these hand levers are used they are pivoted upon a shaft 54, that is supported by segmental bearing plates C², corresponding in construction to the plates C' described, said plates C² being likewise mounted in recesses at the side portions of the body A. The lower ends of the hand levers B' are provided with pins 46ª that enter apertures 55 produced in the transmitting bars at any desired point in their length, and the pins or bolts 46ª are prevented from accidentally leaving the hand levers B', and the transmitting bar, by mounting on the lower ends of the hand levers thumb latches 47ª which are of the same construction as the thumb latches described in connection with the pedals B.

With reference to the clutch device A', it constitutes no feature of this invention, it having been fully described and claimed in Letters Patent granted to me December 17, 1901, No. 689370. In brief, however, the clutch device is constructed as follows: Opposing segmental friction plates 56 and 57 are located in the body member 15, and when extended are brought in frictional engagement with the peripheral portion of the body. These segmental friction plates 56 and 57 are connected at one side of the body by a link 58, securely attached to one plate and pivotally connecting with the opposing plate, and the inner edge of the friction plate 56 at that side which is opposite to the link 58 is provided with an inclined edge 59, and a curved lever 60 is pivoted to the frictional plate 57 extending over the inclined edge 59 and along the side face of the opposing friction disk 56. This lever is provided with a pin 61, that is adapted to engage with the aforesaid inclined edge 59 of the plate 56, and the free end of the lever 60 has a longitudinal slot 62 therein in which is entered a pin 63, that extends from the disk portion of the pinion member 16 of the device, and a spring 64 is attached to the free end of the lever 60 and to the friction plate 57, the spring 64 having a tendency to draw the lever inward so as to carry the friction plates out of frictional engagement with the body of the clutch, but as the pinion 17 is revolved in one direction the pin 63 will force the lever 60 outward, and by means of its pin 61 cause the friction plates 56 and 57 to engage with the peripheral surfaces of the body of the clutch to turn it and the axle to which it is secured. Since the two clutches work alternately in their driving capacity, a continuous rotary motion is imparted to the axle. Since the pedals B act in the same capacity as the hand levers B', the pedals may be considered as levers although the levers B and B' stand at different angles to their pivot shaft so that they act to alternately drive one or the other clutch device and thus impart continuous rotary motion to the axle in one direction.

Among the advantages it may be suggested that there is no dead center to overcome; the mechanism starts at once in the right direction without using the hands and enables the user of the mechanism to make a long and a short stroke; when in motion the user's legs or hands can rest while the machine is running; the levers do not wag back and forth the whole time the machine is in action; either lever can be operated singly, or both as desired; there is no waste of power; the wheels turn instantly, no matter how short the stroke is applied; the movement is a healthy one and is least tiring, as it is a more natural one than the ankle movement, and is more like walking, and further the whole strength of the limbs can be applied.

Having thus described my invention, I claim as new and desire to secure by Letters Patent,—

1. In a vehicle, an axle, clutch devices connected with the axle, a driving pinion for each clutch device, segmental racks pivotally mounted above the pinions and in mesh with the same, pivoted levers at angles to each other, and transmitting bars adjustably connected with said levers, the said bars being pivoted directly to the central portions of the tooth carrying sections of said segmental racks.

2. In a vehicle, an axle, clutch devices connected with the axle, adjustable bearings, locking devices for the bearings, a shaft carried by the bearings, levers independently mounted on said shaft, transmitting bars connected with said levers, and means for driving said clutch devices from the transmitting bars.

3. In a vehicle, an axle, clutch devices secured upon the axle, a driving pinion for each clutch device, segmental racks in engagement with the said pinions, supports for the said racks, levers located one opposite each rack, vertically adjustable supports for the said levers, the levers being independent in their movements, and transmitting bars adjustably connected with said levers and pivotally connected with the said racks.

4. In a vehicle, an axle, clutch devices secured to the axle, a driving pinion for each clutch device, segmental racks pivotally mounted one over each pinion, being in engagement with said pinions, vertically adjustable bearings, supports therefor, a shaft carried by the said bearings, levers independently mounted upon the said shaft, and transmitting bars adjustably connected with said levers and pivotally connected with said racks.

5. In a vehicle, the combination with the body thereof, axles for the body, clutches secured to the rear axle, a driving pinion for each clutch, and a segmental rack mounted for rocking movement above each pinion, being in engagement with said pinions, of adjustable bearing plates located upon the body, locking devices for the bearing plates, a shaft connecting the said bearings, pedals independently mounted upon the said shaft, and adjustable connections between the said pedals and the said racks.

6. In a vehicle, the combination with the body, an axle for the body, clutch devices secured to the rear axle, a pinion for each clutch device, and a segmental rack pivotally mounted above each pinion, being in engagement with said pinions, of bearing plates pivotally mounted upon the inner side faces of the body, each bearing plate being provided with a segmental slot and with an arm extending from its pivot portion, one wall of the said slot being provided with recesses, bolts adjustable upon the body, which bolts pass through the slots of the bearing plates, locking devices for the bolts, a shaft connecting the arms extending from the bearing plates, pedals independently and pivotally mounted upon the said shaft at angles to each other, and transmitting bars pivotally connected with the said racks and adjustably and pivotally connected with the said pedals.

7. In a vehicle, the combination with an operating lever and a transmitting bar, of a pin passed through the said lever and through an aperture in the transmitting bar, and a latch device slidably mounted on the said lever and provided with a hood to cover the head of the said pin.

8. In a vehicle, the combination with the body thereof, a forward and a rear axle, means for turning the forward axle, clutch devices secured to the rear axle, a driving pinion connected with each clutch device, and a segmental rack above each pinion and in engagement therewith, of a segmental bearing plate pivotally mounted upon the inner face of each of the side pieces of the said body, each bearing plate being provided with a forwardly extending arm and a curved slot adjacent its convexed edge, one wall of said slot having recesses therein, bolts slidably mounted in the side pieces of the body, extending out through the slots in the bearing plates, lock nuts for the said bolts, a shaft secured to the arms extending from the bearing plates, pedals mounted to turn upon the said shaft, the pedals being independent of each other and one at an angle to the other, transmitting bars pivotally attached to the said racks, which transmitting bars are provided with series of apertures, pins loosely passed through the pedals and one of the apertures in the transmitting bars, a latch slidably mounted upon the pedal, having an opening therein to expose the head of the pin passing through the pedal, and a hood above said opening to cover the said pin in another position of the latch.

In testimony whereof I have signed my name to this specification in the presence of two subscribing witnesses.

MAYER SLOTKIN.

Witnesses:
J. FRED ACKER.
EVERARD B. MARSHALL.